| United States Patent [19] | [11] | 4,412,023 |
|---|---|---|
| Jernström et al. | [45] | Oct. 25, 1983 |

[54] COATING COMPOSITION

[75] Inventors: Olof Jernström, Vantaa; Tapio Mattila, Espoo; Kyösti Penttinen, Helsinki; Hannu Toivonen, Espoo, all of Finland

[73] Assignee: Tikkurilan Varitehtaat Oy, Vantaa, Finland

[21] Appl. No.: 316,815

[22] Filed: Nov. 2, 1981

[30] Foreign Application Priority Data

Nov. 5, 1980 [FI] Finland ............................ 803452

[51] Int. Cl.$^3$ ............................................. C08K 5/34
[52] U.S. Cl. .................................. 524/106; 428/511; 428/514; 428/537; 524/386; 524/425
[58] Field of Search ........................ 524/106; 106/163; 428/514, 537; 162/158

[56]  References Cited

U.S. PATENT DOCUMENTS

| 2,755,198 | 7/1956 | Stewart | 524/106 |
| 3,240,738 | 3/1966 | Mitamura et al. | 524/106 |
| 3,428,480 | 2/1969 | Wagner et al. | 524/106 |
| 3,445,407 | 5/1969 | Ingleby | 524/106 |
| 4,120,836 | 10/1978 | Auerbach et al. | 524/106 |
| 4,343,655 | 8/1982 | Dodd et al. | 106/214 |

FOREIGN PATENT DOCUMENTS

| 43036 | 11/1981 | European Pat. Off. | 524/106 |
| 2086929 | 5/1982 | United Kingdom | 524/106 |

Primary Examiner—Theodore Morris
Attorney, Agent, or Firm—Bucknam and Archer

[57]  ABSTRACT

A coating composition especially for chipboard (particle board) which releases formaldehyde is described, to which coating composition is added 0.2–10% by weight of cyclic urea, especially ethylene urea.

6 Claims, No Drawings

COATING COMPOSITION

BACKGROUND OF THE INVENTION

The present invention relates to a coating composition which is suitable for coating surfaces, such as boards and in particular wood chipboard (particle board), which give off formaldehyde into the environment.

Wood chipboard is based on the bonding together of wood chips by glue. Glue is applied to the surface of the chips which are then bonded together while under pressure by the hardening of the glue. The glue in finished wood chipboard generally amounts to approx. 8–9% of the dry weight of the wood. The glues used are thermo-setting resins the hardening of which is a chemical reaction and is not based on evaporation of a solvent. Hardening takes place rapidly.

The types of glue most commonly used by the wood chipboard industry are
  carbamide glue
  phenolic glue
  melamine glue.
By far the most used in the manufacture of wood chipboard is carbamide glue, because its cost is comparatively low and its use is technically convenient.

Hardening of the glue sprayed onto the chips is achieved by means of a hardener, which is mixed with the glue shortly before use, and an elevated temperature.

A drawback of the boards made in this way has been found to be the release of formaldehyde, HCHO, from the glue, which is unpleasant and causes difficulties particularly for allergic people. There are several methods of binding the formaldehyde so released and thereby preventing its escape into the air of the room.

Most common is the use as a primer of an alkyld resin paint specially designed for priming wood chipboard, because this primer forms a fairly impervious film. The addition to paint of urea, $H_2NCONH_2$, which reacts with the formaldehyde, is also known. Urea is admittedly cheap, but in order to react sufficiently a large quantity of it is required and this causes various surface defects in the paint film.

Hydrazines have also been used for this purpose (German Pat. No. 1 188 750), which are, however, very toxic and which do not remain in a reactive state in the paint for a sufficiently long time.

SUMMARY OF THE INVENTION

The coating composition of the present invention contains as an active ingredient a cyclic urea compound.

DESCRIPTION OF THE PREFERRED EMBODIMENTS

It has now been surprisingly observed that the addition to the composition of the coating of ethylene urea and/or similar cyclic ureas produces a paint which is very suitable for painting wood chipboard and other such boards and which binds the formaldehyde released. Ethylene urea is very effective in binding the formaldehyde and moreover the use of the substance does not cause any undesirable side effects in respect of the quality of the paint film.

The formula of ethylene urea is

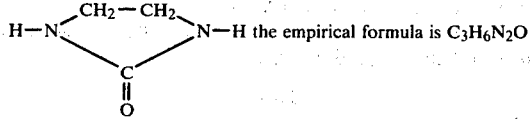

Its chemical name is 2-imidazolidone.
Propylene urea

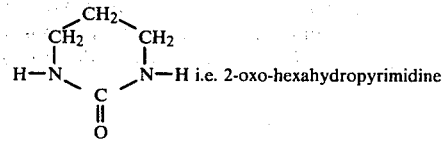

has a similar effect.

A similar effect is also obtained with 4,5-dihydroxyimidazolidone, etc.

From the publication "Textilveredlung 2 (1967), Heft 10" pages 744–757 it is known that cyclic urea compounds react with formaldehyde, and in the publication "Holz als Roh- und Werstoff" 32 (1974) pages 402, 408–410 the use is proposed of cyclic urea compounds in the glue of wood chipboard to reduce the content of free formaldehyde.

Although several substances are known which bind formaldehyde, it is not self-evident that these substances are also suitable for use in the composition of a coating for which very high demands are made regarding the evenness of the film obtained and for which the quantity to be applied ($g/m^2$) should be as low as possible in order to achieve an economic result.

Even though it was no surprise that cyclic urea compounds bind formaldehyde in the composition of coatings according to the present invention, it was quite surprising that an even, high-quality film was obtained with the application of relatively low quantities, which for example was not always achieved using urea. Even in those cases in which a satisfactory film was obtained using urea, its formaldehyde-binding effect was considerably inferior to that obtained with the cyclic urea compounds used in the coating composition according to the invention.

The following examples describe the coating composition according to the invention.

EXAMPLE 1

A paint was made as follows
37 wt. % polyvinyl acetate dispersion as a binder
34 wt. % $TiO_2$ pigment and $CaCO_3$ filler
2.5 wt. % glycols and ethers thereof as auxiliary solvents
1.6 wt. % emulsifiers and thickeners
2.2 wt. % wetting agents and antifoam agents
The above paint was labelled "Ordinary paint".

A paint in accordance with the invention was then made by the addition to the recipe for "Ordinary paint" of 4% by weight of ethylene urea and this paint was labelled "New paint 4".

A further paint in accordance with the invention was made by the addition to "Ordinary paint" of 2% ethylene urea and this was labelled "New paint 2". In addition 0.2–10% urea and a little 25% ammonia may be added if desired when preparing the recipes of "New paint 4" and "New paint 2".

The fourth test paint was "Ordinary paint" to which had been added 3% urea. Denoted "Urea paint 3".

Samples of wood chipboard were coated with these paints and then tested as follows.

Tests

Tests for the measurement of formaldehyde were carried out by placing the coated samples of chipboard into a 120 liter container. The samples were kept there for one week at 85% relative humidity and 20° C. After a week a sample of air was taken by withdrawing 1 liter per hour until 60 liters of air were obtained, from which sample the quantity of formaldehyde was determined as $mg/m^3$.

Results

| | | |
|---|---|---|
| 1. Wood chipboard (unpainted) | | 1.50 $mg/m^3$ |
| 2. Wood chipboard, painted 350 $g/m^2$, | no active ingredient | 0.26 $mg/m^3$ |
| 3. Wood chipboard, painted 350 $g/m^2$ | "Urea paint 3" | 0.17 $mg/m^3$ |
| 4. Wood chipboard, painted 175 $g/m^2$ | "New paint 2" | 0.07 $mg/m^3$ |
| 5. Wood chipboard, painted 175 $g/m^2$ | "New paint 4" | 0.01 $mg/m^3$ |

The results show that by the addition of 2 and 4% by weight of ethylene urea it has been possible to limit the quantity of formaldehyde to an absolute minimum and moreover with a paint application of 175 $g/m^2$. In addition it was found that the paints according to the invention produced a faultless paint film.

The words paint and paint composition are used in this invention to comprise not only ordinary paints but also varnishes and surfacers (fillers) etc.

EXAMPLE 2

To the "Ordinary paint" mentioned in example 1 was added 4% by weight of propylene urea, and similarly 4% by weight of glyoxylmonourea (4,5-dihydroxyethylene urea), and samples of woodchipboard were painted with the paints thus obtained using an application of 200 g paint/$m^2$ chipboard. When the boards thus painted were tested as in example 1 it was found that the quantity of formaldehyde was 0.17 $mg/m^3$ using propylene urea and 0.16 $mg/m^2$ using 4,5-dihydroxyethylene urea, and thus that both propylene urea and 4,5-dihydroxyethylene urea bind the formaldehyde released from wood chipboard, although not as effectively as ethylene urea.

For purposes of comparison a "Urea paint 4" was prepared which contained 4% by weight of urea. When this "Urea paint 4" was applied at 200 g/$m^2$ to samples of chipboard it was, however, found that there were such serious faults in the paint film that it was not considered justified to proceed with the test for efficiency of formaldehyde binding.

What is claimed is:

1. A composition suitable for coating, varnishing or as a filler for wood chipboard, which consists of an ordinary paint, varnish or filler for chipboard including polyvinyl acetate as a binder and 0.2–10% by weight of a cyclic urea compound.

2. The coating composition according to claim 1, in which the cyclic urea compound is ethylene urea.

3. The coating composition of claim 1, comprising 2–4% by weight of the cyclic urea compound.

4. The coating composition according to claim 1, in which the cyclic urea is propylene urea.

5. The composition according to claim 1, wherein the ordinary paint consists of 37% of polyvinyl acetate dispersion as a binder, 34% titanium oxide pigment and Ca/$Co_3$ filler, 2.5% glycols and ethers, 1.6% emulsifiers and thickeners, 22% wetting agents and antifoaming agents, by weight.

6. The method of coating wood chipboard which consists of coating said chipboard with a paint or varnish or filler which contains 0.2–10% by weight of a cyclic urea compound.

* * * * *